(12) United States Patent
Goetz

(10) Patent No.: US 7,571,175 B2
(45) Date of Patent: Aug. 4, 2009

(54) TRANSFORMATION DIRECTIVES IN DATATYPE DEFINITIONS

(75) Inventor: Oliver C. Goetz, Altrip (DE)

(73) Assignee: SAP AG, Walldorf (DE)

( * ) Notice: Subject to any disclaimer, the term of this patent is extended or adjusted under 35 U.S.C. 154(b) by 326 days.

(21) Appl. No.: 11/232,994

(22) Filed: Sep. 23, 2005

(65) Prior Publication Data

US 2007/0073736 A1 Mar. 29, 2007

(51) Int. Cl.
*G06F 17/00* (2006.01)
(52) U.S. Cl. .................. 707/101; 707/102; 707/103 R; 707/104.1
(58) Field of Classification Search ............... 707/1–10, 707/100–104.1, 200–206
See application file for complete search history.

(56) References Cited

U.S. PATENT DOCUMENTS 5,878,422 A * 3/1999 Roth et al. .................. 707/100
2006/0106856 A1* 5/2006 Bermender et al. ......... 707/102

* cited by examiner

*Primary Examiner*—Isaac M Woo
(74) *Attorney, Agent, or Firm*—Finnegan, Henderson, Farabow, Garrett & Dunner, LLP

(57) ABSTRACT

The present invention provides computer-implemented methods and systems for providing a transformation directive in a data type definition statement. The transformation directive specifies one or more transformations to be applied to data before it is stored in a variable of the data type being defined. The runtime framework interprets the transformation directive and applies the transformation to data which is assigned to a variable of the data type that was defined; and stores the transformed value to the variable.

18 Claims, 3 Drawing Sheets

TRANSFORMATION DIRECTIVES IN DATATYPE DEFINITIONS

FIELD OF THE INVENTION

The present invention relates to computer-implemented methods and systems for transforming data, in particular, computer-implemented methods and systems for transforming data using a data type definition statement.

BACKGROUND OF THE INVENTION

To keep pace with rapidly changing business models, business enterprises require a flexible computing environment that allow changes to be implemented quickly and cost-effectively. In recent years, the "services-oriented architecture" (SOA) technology based on Web services has gained popular appeal. SOA technology allows loosely coupled business applications to be assembled from a set of internal and external services and distributed over a connected information technology (IT) infrastructure. In order to be flexible, ubiquitous, and cost-effective to maintain, SOAs are largely open and standards compliant.

One example of an SOA is the Enterprise Services Architecture (ESA) offered by SAP AG. SAP's ESA is an open architecture that builds on the benefits of Web services and is enabled by the SAP NetWeaver platform. Like many SOAs, ESA separates the interface and process definition from the underlying application by modeling the terms of a business relationship using "business objects" defined using one or more standard data definition languages, such as the Web Services Definition Language (WSDL), XML schema (xsd), or specialized XML languages, such as cXML, eBXML, or the Core Components Technical Specification (CCTS) by the UN/CEFACT (United Nations Centre for Trade Facilitation and Electronic Business), WSDL is described in the W3C Note dated 15 Mar. 2001, available at www.w3.org. SAP defines a proprietary extension of the WSDL standard, called WSDL++. A business object may be, for example, an invoice, expense report, purchase order, or other business form requiring data. Using WSDL++, for example, business objects can be described using structured information to simplify the sharing of the business object between business applications.

Most current standards, such as XML, provide limited facilities for datatypes and each defined datatype expects the data in a specific format. Data that is entered into a business object in an unacceptable format can cause problems for an SOA. The problem of non-standard data arises even more frequently today as enterprises merge and become more global. For example, an enterprise may result from the merging of a number of formerly separate entities, each used to entering data into its applications in its own unique format. Enterprises that span different continents may run into the difficulty of having entities in different countries enter data in different manners. For example, Europeans are typically used to entering the date by specifying the day, then the month, while Americans are more used to entering the month, then the day.

These differences in data entry must be addressed at some level or they risk causing error. In XML, for example, an XML schema definition (xsd) consists of components such as type definitions and element declarations that can be used to assess the validity of well-formed element and attribute information items. When data is received into a business object defined in xsd, a program storing data defined by a type definition checks to see if the data falls within the requirements set for the data type. If the data does not exactly meet the restrictions of the data type, the data is rejected and an error occurs.

Non-standard data can be and has been addressed by using programming languages, such as Java and Perl, at the application level. Programmers can, for example, add code to the various applications using the business object to transform data that is stored that is within the restrictions of the data type, but outside the requirements of the application. Perl, for example, has directives that perform pattern replacement and transliteration. In the Java programming language, there can be transformation in class definitions. By allowing transformations only in a high-level programming language such as Java or Perl, however, application programmers must write specialized code for each of the various applications. This prevents total portability of the business object.

By allowing transformation in data type definition statements, business objects can be created that are more readily usable by a wider variety of applications and environments without causing error or requiring special purpose coding of business applications.

SUMMARY OF THE INVENTION

Methods and systems consistent with the present invention provide a transformation directive in a data type definition statement, the transformation directive specifying one or more transformations to be applied to a value before it is stored in a variable of the data type being defined; interpret the transformation directive by a runtime framework; apply the transformation to at least one value which is assigned to a variable of the data type that was defined; and store the transformed value to the variable.

BRIEF DESCRIPTION OF THE DRAWINGS

The accompanying drawings, which are incorporated in and constitute a part of this specification, illustrate various embodiments of the invention and, together with the description, serve to explain the principles of the invention. In the drawings.

DETAILED DESCRIPTION

Figure 1:
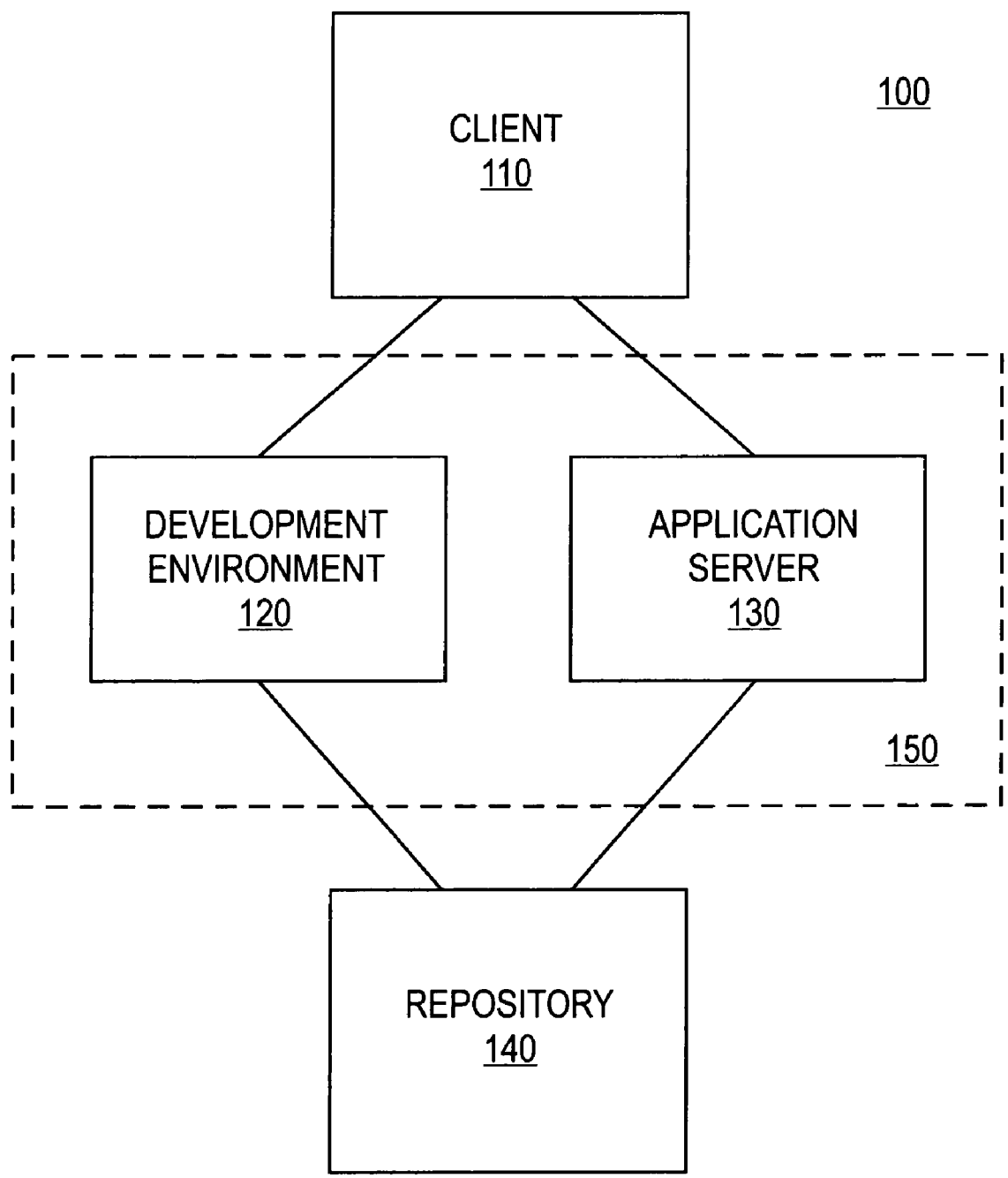
FIG. 1 is a high-level block diagram of a computer system 100 consistent with the present invention.

In methods and systems consistent with the present invention, transformation directives are provided that allow data transformation in data type definitions. Embodiments of the present invention will be described with reference to the accompanying drawings, wherein like parts are designated by like reference numerals throughout, and wherein the leftmost digit of each reference number refers to the drawing number of the figure in which the referenced part first appears. The implementations set forth in the following description do not represent all implementations consistent with the claimed invention. Instead, they are merely some examples consistent with certain aspects related to the invention.

FIG. 1 is a high-level block diagram of a computer system 100 consistent with the present invention. Computer system 100 may comprise a client 110, a development environment 120, a repository 140, and an application server 130. In embodiments consistent with the present invention, development environment 120 and application server 130 may be parts of the same platform or run on the same server 150.

Client 110 may be any computing device capable of being used to access development environment 120 and application server 130. Client 110 may access development environment 120 and application server 130 via any known communications method, such as, for example, by bus, Local Area Network (LAN), Wide Area Network (WAN), Internet, dedicated Intranet, wireless or other type of connection. Further, any suitable combination of wired and/or wireless components and systems may be used to provide a communication method. Similarly, each of development environment 120 and application server 130 may access repository 140 via any known communications method, such as the ones listed above or any combination thereof. Further, the components of computer system 100 may communicate via Web-based protocols, such as Transmission Control Protocol/Internet Protocol (TCP/IP), Hyper Text Transfer Protocol (HTTP), and SOAP (simple object access protocol). While in most embodiments, client 110 will not need direct access to repository 140, such access is not foreclosed and, if warranted, may also be via known communications method, such as those mentioned above. In certain embodiments, client 110 and application server 130 may be the same device or devices.

Client 110 comprises a processor and may comprise one or more memories, input/out devices, or display devices. Client 110 is capable of making a request to instantiate an application on servers 120, 130, 150. As used herein, the term "instantiate" means, in an object oriented programming environment, an object of a particular class, and, more generally, includes deploying, customizing, running and/or executing an application.

Development environment 120 is platform used at design time to design data type definition statements consistent with the present invention and as will be described more below. Development environment 120 may be hardware, software, or a combination of hardware and software. One example of a suitable development environment 120 is the Integration Builder software component of the SAP Exchange Infrastructure (XI) component of SAP's NetWeaver platform. Integration Builder is a tool used to define messages and processes, map one format to another, configure the way the formats will be used by other systems and store the data in a repository, such as data repository 140.

Repository 140 may be any one of a number of commercially available repositories. However, in a preferred embodiment, the Enterprise Services Repository from SAP AG is used. Data repository 140 may employ any of a number of commercially available database systems such as Microsoft Access, dbase, Oracle, Sybase, etc.

Repository 140 may also store business objects that may be created using a data type definition consistent with the present invention. Business objects stored in repository 140 encapsulate their data and processes. External data to the data and processes is only possible by means of specific methods. In at least one embodiment, the business objects may be accessed by means of Business Application Programming Interfaces (BAPI), one well known and widely used application interfaces used to achieve interoperability between various systems and to integrate third party software components with the software offered by SAP AG. In another exemplary environment, such as one existing Netweaver architecture, the Enterprise Services Infrastructure (ESI) provides access to the business objects. Within the ESI, the implementor of the service may use the Service Provider Interface (SPI) to specify business objects and the consumer may use, for example, the Generic Consumer Proxy (GCP) or Typed Consumer Proxy (TCP) of the Enterprise Services Framework to access the business application.

Application server 130 may be any computer platform running a business application. Servers, such as application server 130, may include a storage device and a memory. The memory may contain an operating system, one or more applications as well as their corresponding interfaces. According to an embodiment of the present invention, application server 130 accesses business objects stored in repository 140.

FIG. 1 shows an exemplary computer environment for implementing one or more embodiments of the claimed invention. Methods for modeling and using business objects employing data type definitions consistent with the present invention will be described in more detail below with reference to FIG. 2.

According to the present invention, a "type" to be used in a business object may be defined as design time to transform data from one format to another. In embodiments consistent with the present invention, the type definition comprises one or more expressions that define the transliteration of the data that should take place prior to storage. For example, in one instance, a type definition consistent with the present invention may specify to search for a set of certain patterns and replace those patterns with a different set of patterns. Once the type definition is defined at design time, the type definition may be used in construction of a business object. At run time, data that matches one or more patterns in the set of patterns to be transformed may be replaced with the specified patterns in the replacement set before restrictions and validations are performed by the XML schema.

Figure 2:
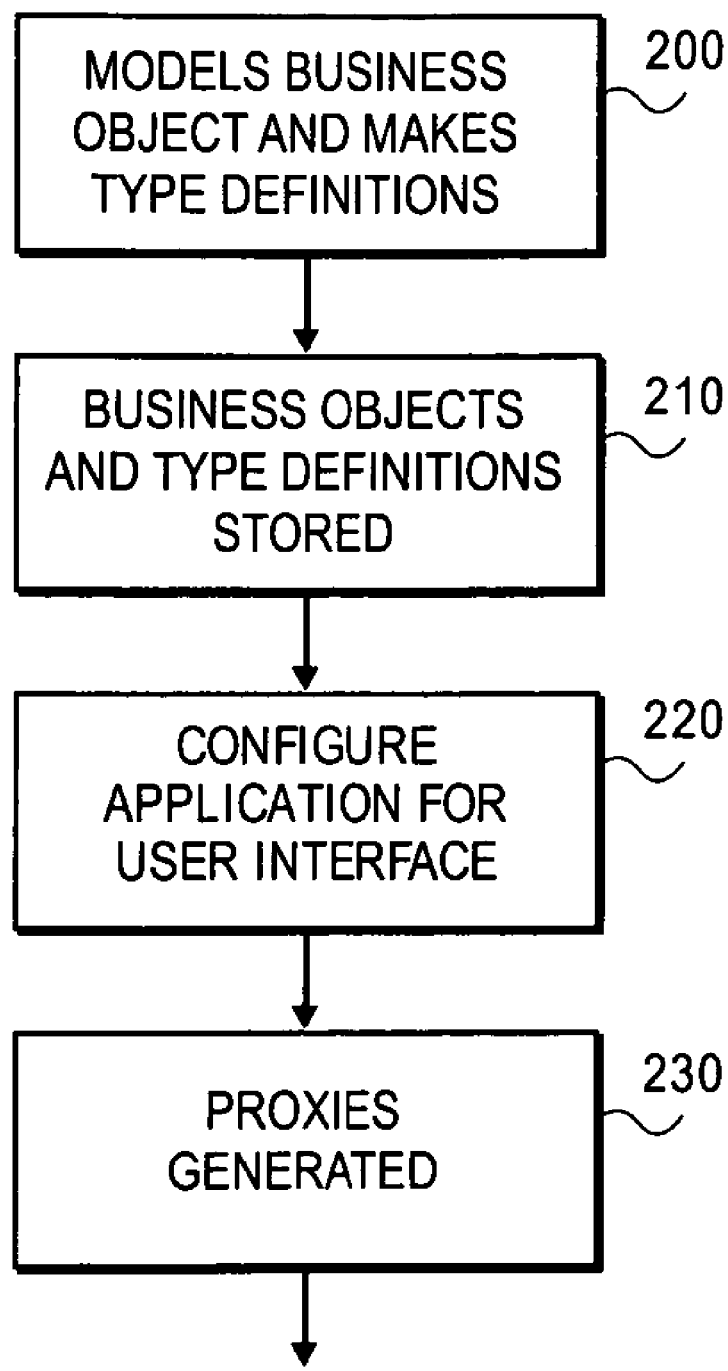
FIG. 2 depicts one exemplary method of modeling a business object consistent with the present invention.

FIG. 2 depicts one exemplary method of modeling a business object according to the present invention. At design time, a first user models the business objects for a particular application and makes the type definitions using a modeling application (step 200). The first user may be, for example, a business professional responsible for designing a particular business object. In an exemplary SAP environment, such as the one described above with respect to FIG. 1, the business objects may be modeled using the Integration Builder software component of NetWeaver.

The modeling application stores the business objects and corresponding type definitions (step 210). In one exemplary environment, for example, such business objects and corresponding type definitions may be stored in the Enterprise Services Repository (ESR).

When a second user (such as an application programmer) wishes to use the business objects and type definitions stored in the ESR, the second user configures the application for the user interface by, for example, selecting particular business objects and type definitions for use (step 220). In some embodiments, the first and second users may be the same person acting in different roles. The second user may select business objects and type definitions for use, for example, by using a user interface.

Additionally, proxies are generated for using the indicated business objects and type definition (step 230). In certain embodiments, proxies are generated upon selection of the particular business objects and type definitions by the user. A proxy is a programming stub that models the look and feel of a particular message. During proxy generation, a copy of the models is stored in the application server, as well as copies of the proxies themselves and the mapping of the data to the corresponding models in the ESR. The application is configured to connect the modeled services to the application and define how the application will look like to the user. In one exemplary embodiment, this may be performed at SAP using the SAP Visual Composer.

Steps 220 and 230 may be performed in the order shown in FIG. 2, or the reverse order. In certain embodiments, steps 220 and 230 may be performed independently of one other or concurrently. Once the application is configured, when the application is invoked, the application uses the generated proxies and not the data stored in the ESR.

Figure 3:
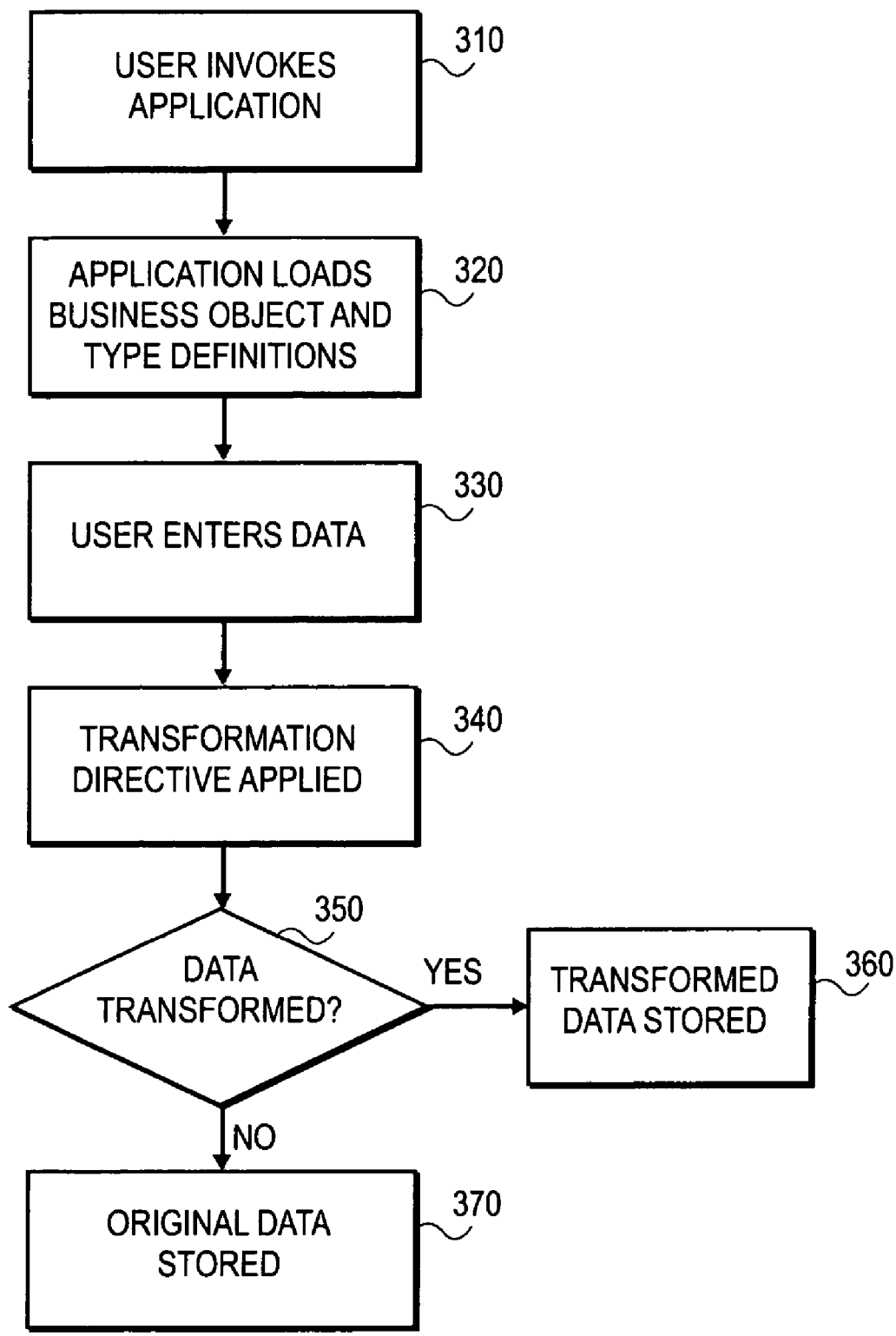
FIG. 3 depicts one exemplary method of performing the value transformation consistent with the present invention.

FIG. 3 depicts one exemplary method of performing a value transformation according to the present invention described. An end user calls the application created by the process described with respect to FIG. 2 (step 310). The end user may call such application by, for example, using a web browser. Upon invocation of the application, the business objects and type definitions that are associated with the application are loaded (step 320). The business objects and type definitions that are retrieved are the copies that were stored on the R/3 application server during proxy generation.

During use of the application, the user adds or requests a change to the data (step 330). In applications, when data is added to a business object, the data is checked against the restrictions associated with the data type during design. During this validation step, a transformation directive consistent with the present invention may be applied to the entered data (step 340). The validation based on the transformed data is performed based on the restrictions defined in the type definition. If incoming data fits the restrictions of the transformation directive (step 350), the data is transformed according to the present invention (step 360). If not (step 350), the original data is stored (step 370).

The following is one example of an xsd type definition for a "Language" type whose values will all be lower case and have only two characters:

```
<?xml version="1.0" encoding="ISO-8859-1"?>
  <xsd:schema xmlns:xsd="http://www.w3.org/2001/XMLSchema"
xmlns="http://sap.com/
test " targetNamespace="http://sap.com/test">
    <xsd:simpleType name="Language">
      <xsd:annotation>
        <xsd:documentation xml:lang="EN">
          Language of the entry
        </xsd:documentation>
      </xsd:annotation>
      <xsd:restriction base="xsd:string">
        <xsd:minLength value="2" />
        <xsd:maxLength value="2" />
        <xsd:pattern value="[a-z]+" />
        <xsd:transformation value="s/(..).*/\1/ tr/A-Z/a-z/" />
      </xsd:restriction>
    </xsd:simpleType>
  </xsd:schema>
```

The portion highlighted in bold is a representative example of a transformation directive consistent with the present invention. Transformation directives consistent with the present invention comprise one or more directives for transform data from one format for another, such as search and replace directives or transliteration directives.

In the Language type above, the "pattern value" directive immediately above the bolded transformation directive will check the value range of the data to ensure that all characters are lower case. Without a transformation directive consistent with the present invention (as appears on the next line in bold), if all characters are not lower case, the data will be rejected.

However, in the example above, the transformation directive will transform most, if not all, data before failure occurs. The exemplary transformation directive, shown above in bold, actually comprises two directives that are applied in sequence to any values which are assigned to a variable of the type. The first directive truncates the input value to two characters (s/( . . . ).*/\1/) and the second directive converts all upper case characters to lower case (tr/A-Z/a-z/). In the first directive, the program searches for a string pattern with length equal to two. In the second directive, capital letters A-Z are replaced with lower case letters a-z. In this example, rather than just rejecting a value which does not conform to the restrictions in the type definition, the transformation directives allows the runtime environment to try and convert the value to something which conforms to the restrictions.

After the transformation takes place, the resulting value is still checked against the defined restrictions. For example, if a value which contains numbers like "F4" would be given, this would be transformed to "f4" and still be rejected because it does not match the given pattern "[a-z]+" which only allows for lower case letters in the value.

In certain embodiments of the present invention, the transformation directive includes a scripting engine that allows providing of transformation directives in the form of a program that is applied to values that are to be assigned to a variable of a given datatype. In this exemplary embodiment, the directive may look like the following:

```
<xsd:transformation>
  <script language="perl">
    $value = $ARGV[0];
    if ($value =~ /^(\d+)\/(\d+)\/(\d+)$/) {
    # American format with / as separator mm/dd/yyyy
      $month = $1;
      $day = $2;
      $year = $3;
    } elsif ($value =~ /^(\d+)\.(\d+)\.(\d+)$/) {
    # German format with . as separator dd.mm.yyyy
      $day = $1;
      $month = $2;
      $year = $3;
    } else {
    # no valid format, return original string
      return $value;
    }
    # check if the year is given complete with century
    if ($year < 100) {
      $year = 2000 + $year;
    }
    # format the internal storage format yyyymmdd
    return sprintf("%04d%02d%02d", $year, $month, $day);
  </script>
</xsd:transformation>
```

In the example above, the transformation directive uses a script written in the Perl programming language, however, other languages, such as VBScript, JavaScript, Python, or the like, may also be used. As shown above, the language tag in the script element specifies the script language (in this case Perl). The script expects the value in a special variable $ARGV[0] (which is used in Perl for the first command line argument when a script is called). The script in the example checks the value first against the American date format with a month, day, and year separated by a "/" and extracts the three values separately. If this fails, it checks against the German format day, month, year, separated by ".". If this fails as well, the transformation will not succeed and the original value is returned. In successful cases, the script proceeds and checks if the year was given with a century; if not, 2000 is added to the year (of course, with a bit more elaborate coding one could write a script which takes the century information from the current system time). After that, the date is formatted into an internal format used for storage. This is just one example of the type of format checks that may be made by a script in a transformation directive consistent with the present invention.

Aspects of the invention described herein may also be embodied in a computer program product or a computer-readable medium with a computer program product stored thereon. Certain aspects of the present invention may be embodied in a display on a display device.

It is to be understood that the foregoing description is intended to illustrate and not to limit the scope of the invention, which is defined by the scope of the appended claims. Other embodiments are within the scope of the following claims.

I claim:

1. A computer-implemented method for transforming data, the method comprising:
   providing a transformation directive in a business object data type definition statement, the transformation directive specifying one or more transformations to be applied to data to convert the data into a format which conforms to predetermined restrictions before the data is stored in a variable of the business object data type being defined;
   interpreting the at least one transformation directive by a runtime framework;
   applying the transformation to data which is assigned to a variable of the business object data type that was defined;
   checking the transformed data to determine if the transformed data conforms to the predetermined restrictions; and
   storing the transformed data in the variable.

2. The computer-implemented method of claim 1, wherein the transformation directive comprises a search and replace instruction.

3. The computer-implemented method of claim 1, wherein the transformation directive comprises a transliteration instruction.

4. The computer-implemented method of claim 1, wherein the transformation directive comprises a scripting engine.

5. The computer-implemented method of claim 1 further comprising storing the business object data type definition statement in a repository.

6. The computer-implemented method of claim 1 further comprising checking the data against restrictions included in the business object data type definition statement.

7. A computer program product for transforming data, the product comprising instructions operable to cause a processor to:
   provide a transformation directive in a business object data type definition statement, the transformation directive specifying one or more transformations to be applied to data to convert the data into a format which conforms to predetermined restrictions before the data is stored in a variable of the business object data type being defined;
   interpret the at least one transformation directive by a runtime framework
   apply the transformation to data which is assigned to a variable of the data type that was defined;
   checking the transformed data to determine if the transformed data conforms to the predetermined restrictions; and
   store the transformed data in the variable.

8. The computer program product of claim 7, wherein the transformation directive comprises a search and replace instruction.

9. The computer program product of claim 7, wherein the transformation directive comprises a transliteration instruction.

10. The computer program product of claim 7, wherein the transformation directive comprises a scripting engine.

11. The computer program product of claim 7 further comprising instructions operable to cause a processor to store the business object data type definition statement in a repository.

12. The computer program product of claim 7 further comprising instructions operable to cause a processor to check the data against restrictions included in the business object data type definition statement.

13. A system for providing at least one readable object for a search engine from at least one structured data object stored in a database, the system comprising:
   a development environment for providing a transformation directive in a business object data type definition statement, the transformation directive specifying one or more transformations to be applied to data to convert the data into a format which conforms to predetermined restrictions before the data is stored in a variable of the business object data type being defined;
   a runtime framework for interpreting the transformation directive, applying the transformation to data which is assigned to a variable of the data type that was defined, and checking the transformed data to determine if the transformed data conforms to the predetermined restrictions; and
   storage means for storing the transformed data to the variable.

14. The system of claim 13, wherein the transformation directive comprises a search and replace instruction.

15. The system of claim 13, wherein the transformation directive comprises a transliteration instruction.

16. The system of claim 13, wherein the transformation directive comprises a scripting engine.

17. The system of claim 13 further comprising storage means for storing the business object data type definition statement in a repository.

18. The system of claim 13, the runtime framework further capable of checking the data against restrictions included in the business object data type definition statement.

* * * * *